United States Patent [19]
Duvacquier et al.

[11] Patent Number: 6,146,598
[45] Date of Patent: Nov. 14, 2000

[54] INITIATOR UNIT HAVING A SELF LOCKING TWO WIRE CONNECTOR FOR PYROTECNIC GENERATORS

[75] Inventors: Daniel Duvacquier, Bordeaux; Christian Perotto, Ballancourt, both of France

[73] Assignee: SNC Livbag, Vert le Petit, France

[21] Appl. No.: 09/252,861

[22] Filed: Feb. 18, 1999

Related U.S. Application Data

[63] Continuation of application No. 08/838,043, Apr. 22, 1997, abandoned.

[30] Foreign Application Priority Data

Apr. 22, 1996 [FR] France ................................ 96 04995

[51] Int. Cl.$^7$ ............................. F42B 3/198; B60R 21/26; C06D 5/00
[52] U.S. Cl. ........................ 422/166; 280/735; 280/741; 439/391; 439/426; 439/594; 439/752; 439/395; 361/248
[58] Field of Search ..................... 422/165, 166; 280/741, 735; 361/248, 264; 439/384, 385, 391, 426, 441, 444, 594, 720, 739, 752, 395, 410

[56] References Cited

U.S. PATENT DOCUMENTS

| 5,356,307 | 10/1994 | Dechelette | 439/421 |
| 5,404,263 | 4/1995 | Graves et al. | 361/247 |
| 5,431,440 | 7/1995 | Spies et al. | 280/735 |
| 5,660,413 | 8/1997 | Bergerson et al. | 280/741 |

FOREIGN PATENT DOCUMENTS

| 474 113 | 3/1992 | European Pat. Off. . |
| 512 682 | 11/1992 | European Pat. Off. . |
| 102 156 | 3/1994 | European Pat. Off. . |

Primary Examiner—Marian C. Knode
Assistant Examiner—Frederick T. Varcoe, Jr.
Attorney, Agent, or Firm—Pillsbury Madison & Sutro LLP

[57] ABSTRACT

The present invention relates to a two-wire pyrotechnic initiator unit intended for motor-vehicle safety. The initiator unit comprises a socket molded over electrodes which are connected, on the one hand, to a pyrotechnic ignition device and, on the other hand, to unstripped electrical wires via deformable conducting pincers capable of cutting the insulating sheath of the wires. The wires are supported by an elastic ring which can be snap-fastened in the socket and which presses the conducting pincers. The initiator unit is useful for manufacturing two wire pyrotechnic gas generators for inflatable cushions or seat belt tensioners in which the unstripped wires are only incorporated at the end of the assembly.

12 Claims, 7 Drawing Sheets

PRIOR ART

INITIATOR UNIT HAVING A SELF LOCKING TWO WIRE CONNECTOR FOR PYROTECNIC GENERATORS

This is a continuation of application Ser. No. 08/838,043, filed Apr. 22, 1997, now abandoned.

The present invention relates to the field of motor-vehicle safety. More specifically, the invention relates to a pyrotechnic initiator unit having a self-locking two-wire socket, allowing two-wire pyrotechnic gas generators to be easily assembled.

The inflation of protective cushions or the tensioning of seat belts in the event of motor-vehicle accidents requires, given the very short response times demanded of the safety devices, the use of pyrotechnic gas generators.

These pyrotechnic gas generators essentially comprise a pyrotechnic gas-generating composition fired, in the event of an accident, by an initiator unit which converts the electric signal delivered by a collision detector into a combustion phenomenon.

The initiator unit therefore has two electrodes, generally cylindrical, which are located on the periphery of the generator and which come to be connected into a connector which is connected by lead wires to the collision detector delivering the electrical pulse.

Generators equipped with such initiator units, which are, for example, described in French Patent Application 95/02100, also issued as U.S. Pat. No. 5,738,374, have the drawback of possibly exhibiting, over time, poor electrical contacts, especially as a result of the vibrations to which they are subjected.

For safety reasons, manufacturers increasingly require the generator to be equipped with an initiator unit having wires, also called a two-wire initiator unit, so that the generator is directly connected to the collision detection module, thus guaranteeing that good electrical contacts are maintained over time.

To do this, it is necessary that the electrodes of the initiator unit be fixed, by soldering or by bonding, to the electrical lead wires, as is described for example in U.S. Pat. No. 5,345,872 and U.S. Pat. No. 5,433,147. However, this apparently simple solution poses new problems to those skilled in the art in respect of the industrial-scale production of generators equipped with such initiator units.

On an industrial scale, the pyrotechnic gas generators are assembled continuously on assembly lines, generally from the initiator unit.

If the wires are fixed to the electrodes of the initiator unit at the start of the assembly line, it is necessary to transfer over the entire line generators extended by wires which may be more than one meter in length, something which is not practical.

If the wires are fixed to the electrodes of the initiator unit at the end of the assembly line, or later at the equipment-maker's, or even at the motor-vehicle constructor's, this fixing will, with the currently known means, be external to the initiator unit, and therefore to the generator, and will not provide all the desired safety guarantees. Moreover, those skilled in the art do not like making soldered joints on a pyrotechnic generator containing active substances.

Finally, whether they are carried out at the start or at the end of the assembly line, the wire-fixing operations often slow down the rate of manufacture of the generators.

Those skilled in the art are therefore faced with the problem of how to fix, simply and irreversibly, lead wires to the electrodes of a pyrotechnic initiator unit contained in a gas generator, and so that the fixing is internal to the detonator or to the gas generator.

The object of the present invention is specifically to provide a solution to this problem.

The invention therefore relates to a two-wire pyrotechnic initiator unit consisting mainly of:

i) a socket whose ends consist of two faces, the said socket having a first central bore, called "lower" bore, emerging on one of the said faces and into which two electrical lead wires penetrate, each consisting of a conducting core surrounded by an insulating sheath, as well as a second central bore, called the "upper" bore, which is separated from the first bore and which emerges on the other face and which contains a pyrotechnic initiation device;

ii) two electrodes fixed inside the said socket and the ends of which are located in each of the two bores, the lower ends of each electrode being connected to one of the said lead wires while the upper ends of the said electrodes are connected to the pyrotechnic initiation device;

and characterized in that:

iii) each of the said electrodes is terminated in its lower part by a conducting pincer capable, under the stress of a thrust exerted in the extension of the said electrodes, of clamping one of the said lead wires, cutting its insulating sheath;

iv) the lower part of the said first central bore has at least one recess;

v) the ends of the said lead wires penetrating into the first central bore of the said socket are supported by a closure ring whose side wall has at least one external rib allowing, by engagement in the said recess, the ring to be irreversibly snap-fastened into the socket, the said ring moreover including elements for stressing the said conducting pincers.

Advantageously, the said first central bore has two separate grooves constituting the said recesses.

Also advantageously, the said socket is an axisymmetric socket whose ends consist of two plane faces, the first and second bores being axisymmetric bores.

According to a preferred embodiment of the invention, each conducting pincer essentially consists of two plane metal tabs lying opposite each other, each tab including a deformable region consisting of two metal fastening elements in the form of circular sectors facing each other. The two tabs are connected together so that, when the said tabs are in abutment, a thrust exerted on the latter causes their deformable regions to contract with the metal fastening elements bending towards the centre of the space lying between the two tabs. In this configuration, the metal fastening elements act as cutting nippers. Such pincers are, for example, described in Patents EP-A-0,102,156 and EP-B-0,474,113.

According to a second preferred embodiment of the invention, two cylindrical bores, into which each of the sheathed lead wires penetrate, pass through the said closure ring.

Advantageously, each of the these two bores comprises a lower part whose diameter is substantially equal to the outside diameter of the sheathed lead wires and an upper part whose diameter allows insertion of a conducting pincer. In this configuration, the closure ring has, in each of the bores, a bottom located at the junction of the said lower part and the said upper part.

Preferably, the lower part of each bore in the ring is extended inside the ring by a hollow collar whose inside diameter is substantially equal to the outside diameter of the said sheathed wires, the bottoms and the said collars thus constituting the elements for stressing the said conducting pincers.

According to a third preferred embodiment of the invention, the said socket is moulded over the said electrodes, the said socket possibly being made of plastic or of ceramic coated with a plastic layer.

According to a fourth preferred embodiment of the invention, the pyrotechnic initiation device consists of a resistance fixed to the said electrodes and of a pyrotechnic initiation composition which advantageously consists of an ignition powder, for example a powder based on lead styphnate possibly mixed with a nitrocellulose-based lacquer. The said resistance may advantageously consist of a resistance wire or of a resistance printed circuit.

Depending on the situation, the initiator unit will be used as it is or reinforced with an active powder contained in a shatterable metal shroud bearing on the upper part of the socket. As active powder, it will be advantageous to use powders of the titanium/potassium perchlorate, zirconium/potassium perchlorate or even boron/potassium nitrate type.

According to a fifth preferred embodiment of the invention, the said electrodes are surrounded by at least one ferrite core.

The invention also relates to the use of a pyrotechnic initiator unit such as the one described hereinabove in a pyrotechnic gas generator intended for motorvehicle safety.

This generator may be a generator intended to inflate a cushion for protecting an occupant of a motor vehicle or else a generator intended to actuate a seatbelt retractor for an occupant of a motor vehicle.

Finally, the invention also relates to a method of assembling, on a continuous line, a pyrotechnic gas generator using such an initiator unit, the method being characterized in that the initiator unit, without the lead wires and the closure ring, is incorporated into the generator at the start of the assembly line and in that the said lead wires supported by the closure ring are only incorporated into the initiator unit later, either at the end of the assembly line or at the equipmentmaker's or motor-vehicle constructor's. It should be noted that the invention allows the use of unstripped sheathed wires, constituting an additional advantage of the invention.

The invention thus enables the lead wires to be connected, reliably, irreversibly and without any soldering, to the initiator unit contained in the generator, the junction of the wires with the electrodes being internal to the initiator unit or to the generator.

A preferred embodiment of the invention will now be described with reference to FIGS. 1 to 13.

According to the figures, the electrical leads consisting of the lead wires and their sheaths are shown cut or uncut for reasons of clarity of the figures.

Figure 1:
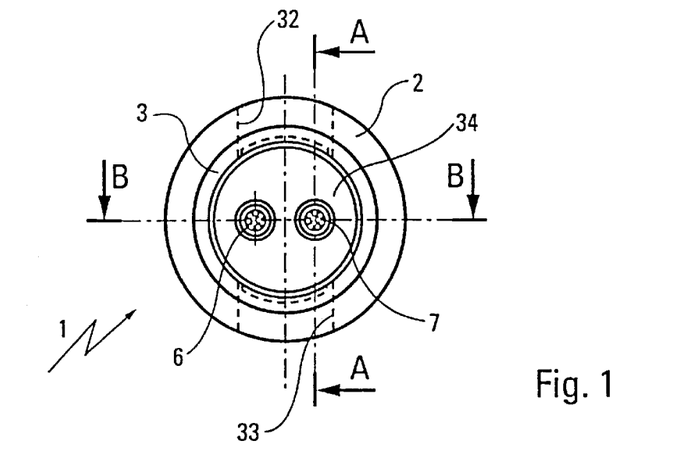
FIG. 1 is a view of the lower face of an initiator unit according to the invention, in which the conducting pincers constitute separate pieces- of the electrodes.
Figure 2:
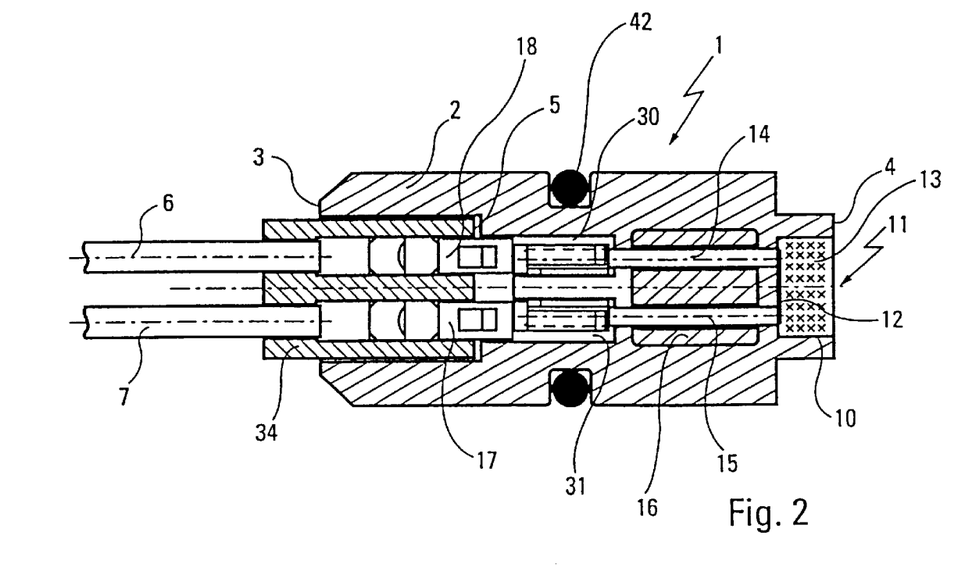
FIG. 2 is a section on BB of the initiator unit shown in FIG. 1.
Figure 3:
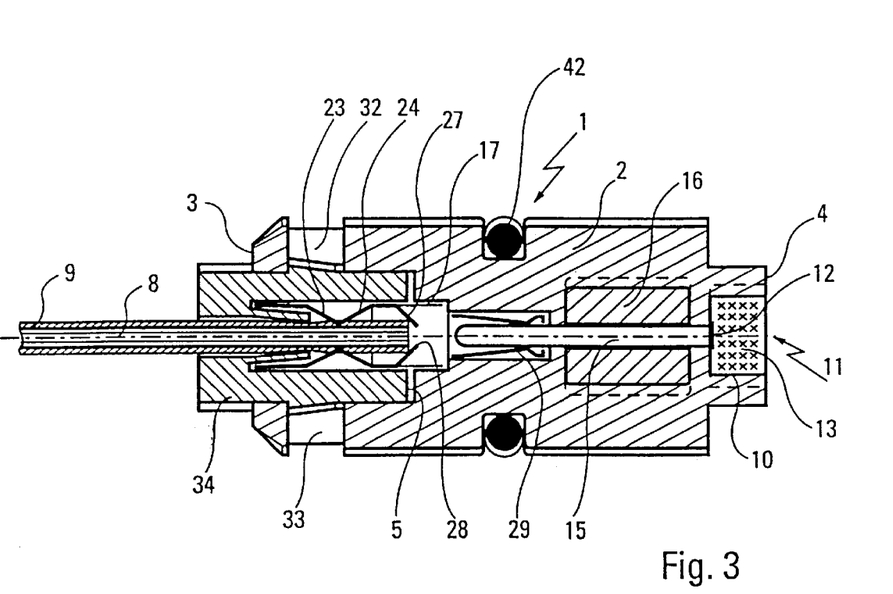
FIG. 3 is a section on AA of the initiator unit shown in FIG. 1.

Referring more particularly to FIGS. 1 to 3, it may be seen that a two-wire initiator unit 1 according to the invention comprises an axisymmetric socket 2, of cylindrical general shape, whose ends consist of two plane faces 3 and 4. The socket 2 is made of a material which is insulating with respect to the electric-current, for example a plastic or a ceramic coated with a plastic, and carries an external seal 42 in order to allow it to be inserted into a gas generator.

The socket 2 has a first axisymmetric central bore 5 emerging on the plane face 3. In the rest of the description, the bore 5 will be termed "lower" bore and the face 3 will be termed "lower" face. Two electrical lead wires 6 and 7, each consisting of an electrically conducting core 8 surrounded by an insulating sheath 9, penetrate into the bore 5.

The socket 2 has a second axisymmetric central bore 10 emerging on the face 4 opposite the face 3. In the rest of the description, the bore 10 will be termed "upper" bore and the face 4 will be termed "upper" face.

The upper bore 10 contains a pyrotechnic initiation device 11 consisting of a resistance wire 12 covered with a pyrotechnic initiation composition 13.

Two electrodes 14 and 15 are fixed inside the base 2. As may be seen in FIGS. 2 and 3, the base 2 is moulded over the said electrodes. Advantageously, the electrodes 14 and 15 are surrounded by a ferrite core 16.

The upper ends of the said electrodes are soldered to the resistance wire 12 of the pyrotechnic initiation device 11.

The lower ends of the said electrodes are each connected to one of the lead wires 6 or 7; according to a first characteristic of the invention, each of the electrodes 14 and 15 is terminated in its lower part by a conducting pincer 17 and 18 capable, under the stress of a thrust exerted in the extension of the said electrodes, of clamping one of the said lead wires 6 or 7, cutting its insulating sheath 9.

In the embodiment shown in FIGS. 1 to 3, the conducting pincers 17 and 18 constitute separate pieces of the electrodes 14 and 15 and, during assembly, they are connected to the latter, as will be explained a little later in the description.

Figure 4:
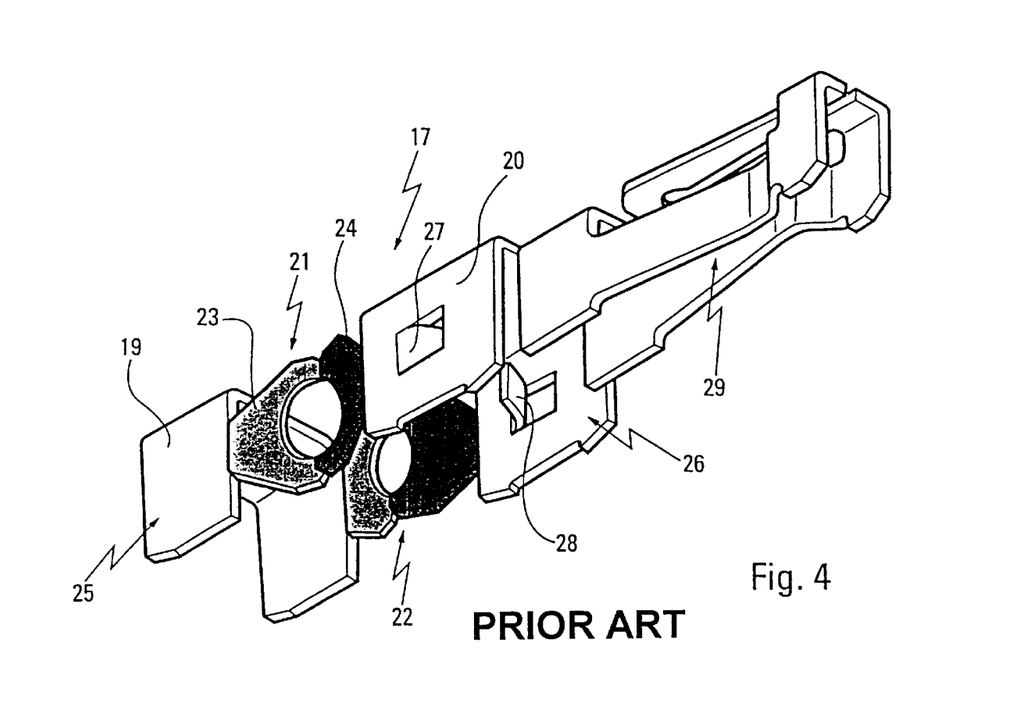
FIG. 4 is a perspective view of a conducting pincer used for producing the initiator unit shown in FIGS. 1 to 3.

Such a conducting pincer has been shown, in perspective, in FIG. 4.

The pincer 17 essentially consists of two U-shaped rigid metal clips 19 and 20 each lying in the extension of the other. The side walls of the two clips 19 and 20 are connected together by two deformable junctions 21 and 22, each consisting of two metal fastening elements 23 and 24 in the form of circular sectors facing each other. Thus, the pincer 17 is presented as essentially consisting of two plane metal tabs 25 and 26 lying opposite each other, each tab having a deformable region which coincides with the deformable junctions 21 and 22.

The separation between the tabs 25 and 26 allows a lead wire 6 or 7 to be inserted. Two internal stops 27 and 28 made on the side walls of the clip 20 define the limit of insertion of such a lead wire.

The pincer 17 is extended by a connector 29 capable of gripping one of the electrodes 14 or 15 tightly.

Such a pincer is described in detail in Patent Application EP-A-0,102,156.

It may also be seen in FIG. 2 that the lower bore 5 is extended by two narrow bores 30 and 31 surrounding respectively the lower ends of the electrodes 14 and 15. These bores 30 and 31 allow insertion of the connectors 29 for the conducting pincers 17 and 18, while at the same time acting as a stop to insertion of the tabs 25 and 26.

According to a second characteristic of the invention, the inner part of the first bore 5 has two recesses in the form of diametrically opposed radial grooves 32 and 33.

According to a third characteristic of the invention, the ends of the lead wires 6 and 7 penetrating into the lower bore 5 of the socket 2 are supported by a closure ring 34. It is essential, for reasons which will be explained later in the description, that this closure ring be made of an electrically non-conducting plastic having a degree of elasticity.

Figure 5:
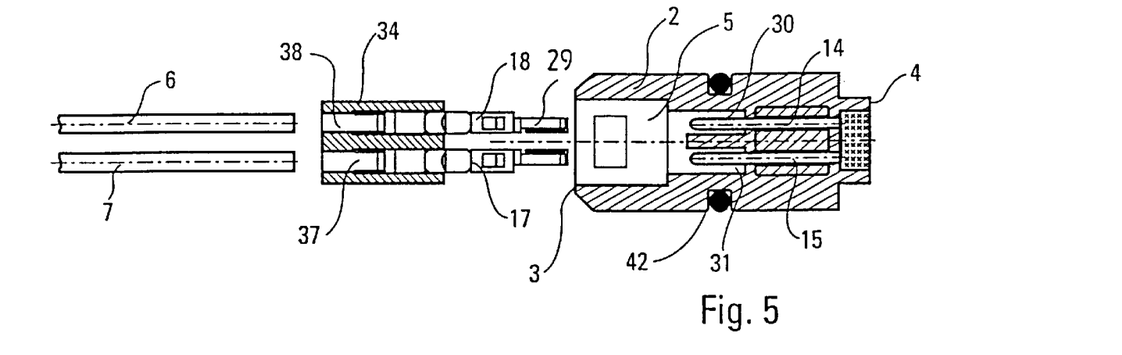
FIGS. 5 and 6 illustrate, seen in section respectively on BB and AA, the method of assembling the lead wires, the closure ring and the conducting pincers in the initiator unit shown in FIGS. 1 to 3.
Figure 6:
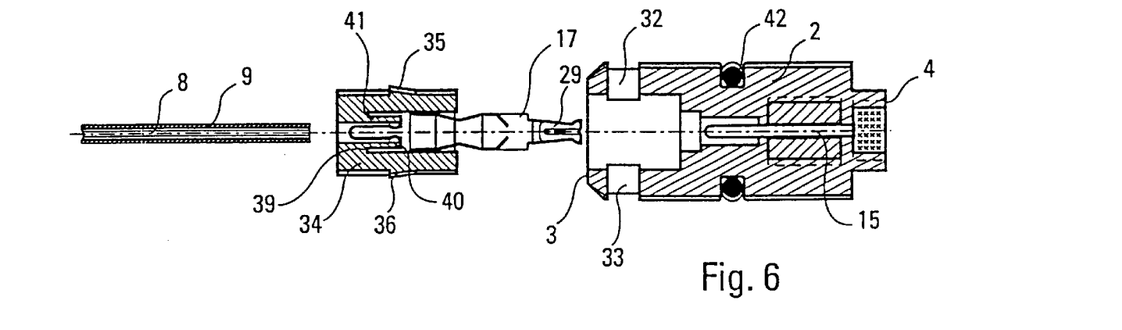

Referring more particularly to FIGS. 5 and 6, it may be seen that on its external side wall this closure ring 34 has two ribs 35 and 36 allowing, by engagement in the grooves 32 and 33, irreversible snap-fastening of the ring 34 in the socket 2.

Two bores 37 and 38, into which each of the sheathed lead wires 6 or 7 penetrate, pass through the ring 34 of cylindrical general shape.

Each of the two bores 37 or 38 of the ring 34 comprises a lower part whose minimum dimensions are substantially equal to the outside diameter of the sheathed lead wires 6 or 7 and an upper part whose dimensions allow insertion of one of the conducting pincers 17 or 18, the closure ring thus having in each of the bores a bottom 39 serving as a rear stop for the pincers 17 or 18.

The lower part of each bore is extended inside the ring 34 by two tongues 40 and 41 whose separation is substantially equal to the outside diameter of the sheathed wires 6 or 7, the bottoms 39 and the tongues 40 and 41 thus constituting elements for stressing the conducting pincers 17 and 18 as will now be explained.

The insertion of the lead wires 6 and 7 into the initiator unit 1 takes place as shown in FIGS. 5 and 6.

The conducting pincers 17 and 18 are inserted into the ring 34, the pincers coming into abutment against the bottoms 39 by being held in place by the tongues 40 and 41. The sheathed lead wires are then inserted into the bores 37 and 38 and the ring 34 thus equipped is then forcibly inserted into the lower bore 5 of the initiator unit until the ribs 35 and 36 are snap-fastened in the radial grooves 32 and 33. It is to allow this insertion and this snap-fastening of the ribs 35 and 36 that it is essential that the closure ring 34, as well as the external layer of the socket 2, have a degree of elasticity.

The connectors 29 for the conducting pincers 17 and 18 penetrate into the narrow bores 30 and 31 and come into contact with the electrodes 14 and 15, while the tabs of these pincers come into abutment against the bottom of the bore 5 and the lead wires penetrate into the pincers as far as the internal stops 27 and 28.

The conducting pincers 17 and 18 have an initial length such that, under these conditions, the insertion of the ring 34 until it is snap-fastened requires deformation of the deformable junctions 21 and 22 by the inward bending, towards the inside of the pincers, of the metal fastening elements 23 and 24 which grip the lead wires 6 and 7 tightly, cutting through their insulating sheath in order to come into contact with the conducting cores, as may be seen in FIG. 3.

From then on, there is electrical junction continuity between the wires 6 and 7 and the pyrotechnic initiation device 11.

It should be pointed out that from then on neither the ring 34 nor the lead wires 6 and 7 are able any longer to be removed from the initiator unit 1.

It is also possible firstly to insert the pincers into the initiator unit and then the ring and the lead wires.

The invention thus makes it possible on a continuous line to use a method of assembling pyrotechnic gas generators equipped with lead wires in which the initiator unit, without the lead wires and the closure ring, is incorporated into the generator at the start of the assembly line and in which the sheathed lead wires supported by the closure ring, optionally provided with conducting pincers, are only incorporated into the initiator unit, contained in the generator, later, this incorporation being irreversible, internal to the initiator unit and therefore to the generator, and requiring no soldering.

Shown in FIGS. 7 to 11 is an alternative embodiment, in which the electrodes and the conducting pincers form single pieces.

These figures show an initiator unit 51 comprising a socket 52 whose ends consist of two plane faces 53 and 54. The socket 52 has an axisymmetric lower bore 55 emerging on the lower plane face 53, into which two lead wires 56 and 57, each consisting of a conducting core 58 surrounded by an insulating sheath 59, penetrate.

Figure 8:
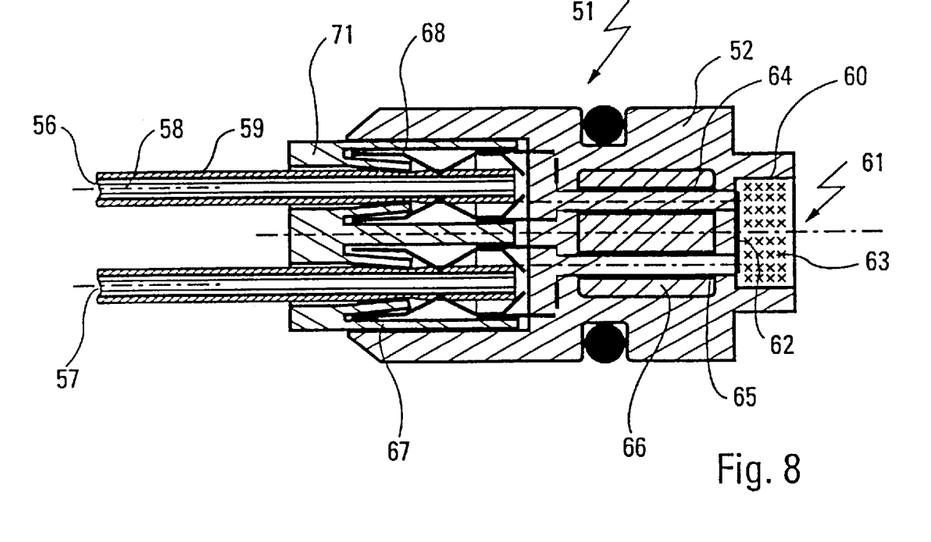
FIG. 8 is a section on DD of the initiator unit shown in FIG. 7.
Figure 9:
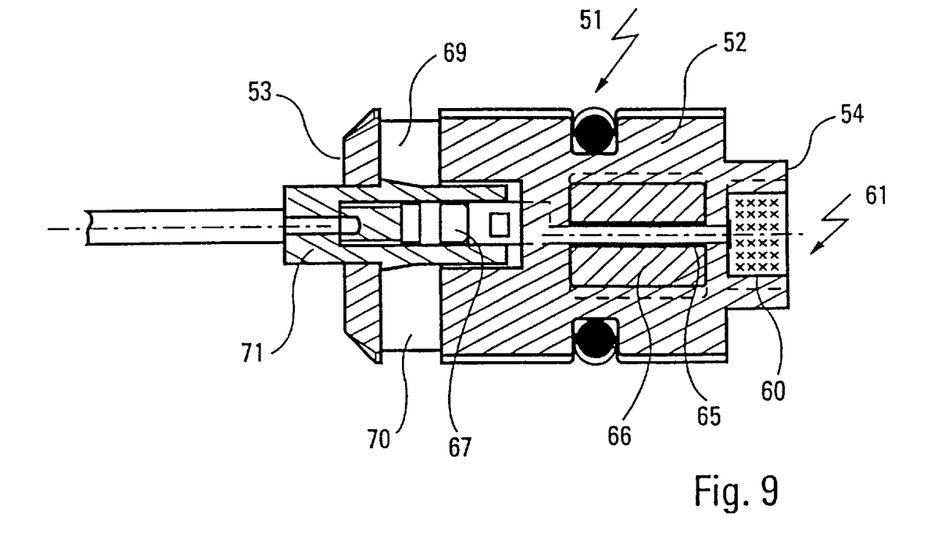
FIG. 9 is a section on CC of the initiator unit shown in FIG. 7.

The socket 52 also has a second bore, called upper bore 60, emerging on the other plane face 54 and containing a pyrotechnic initiation device 61 consisting of a resistance wire 62 and of a pyrotechnic composition 63.

The socket 52 is moulded around two electrodes 64 and 65 surrounded by a ferrite core 66 and incorporating in their lower part conducting pincers 67 and 68 similar to those described earlier.

The lower part of the first bore 55 has two radial grooves 69 and 70.

Figure 10:
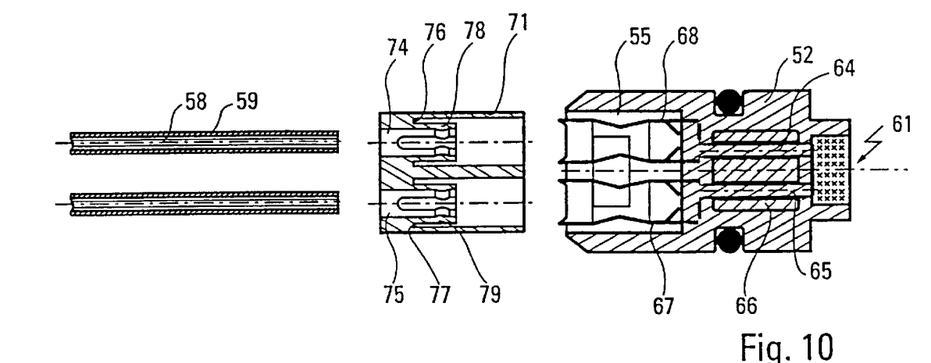
FIGS. 10 and 11 illustrate, seen in section respectively on DD and CC, the method of assembling the lead wires and the closure ring in the initiator unit shown in FIGS. 7 and 9.
Figure 11:
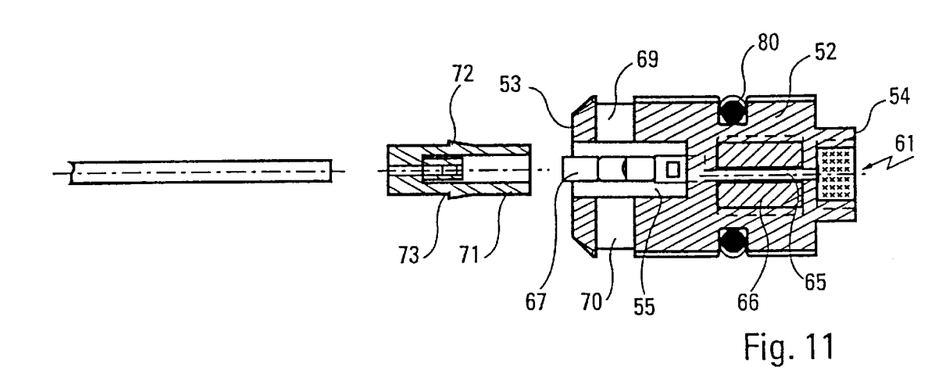

The ends of the lead wires 56 and 57 penetrating into the bore 55 are supported by a closure ring 71 made of insulating plastic having a degree of elasticity. The ring 71 is an axisymmetric piece of elliptical cross-section which has two external ribs 72 and 73 allowing, by engagement in the radial grooves 69 and 70, irreversible snap-fastening of the ring 71 into the socket 52.

Two cylindrical bores 74 and 75 pass through the closure ring 71, each bore having a lower part whose diameter is substantially equal to the outside diameter of the sheathed lead wires 56 and 57 and an upper part whose diameter allows insertion of one of the conducting pincers 67 or 68, the closure ring thus having, in each of the bores 74 and 75, a bottom 76 and 77.

Moreover, the lower part of each of the bores 74 and 75 is extended inside the ring 71 by a notched, cylindrical and hollow collar 78 and 79 whose inside diameter is substantially equal to the outside diameter of the said sheathed wires 56 and 57. The bottoms 76 and 77, as well as the notched collars 78 and 79, constitute the elements for stressing the conducting pincers 67 and 68.

Finally, the socket 52 carries an external seal 80 in order to allow its use in a pyrotechnic gas generator.

The lead wires 56 and 57 are fitted into the initiator unit 51 by inserting them into the ring 71 and by forcibly inserting the latter into the bore 55. The operation of the conducting pincers 67 and 68 is then identical to that explained earlier in respect of the pincers 17 and 18 of the initiator unit 1.

Figure 7:
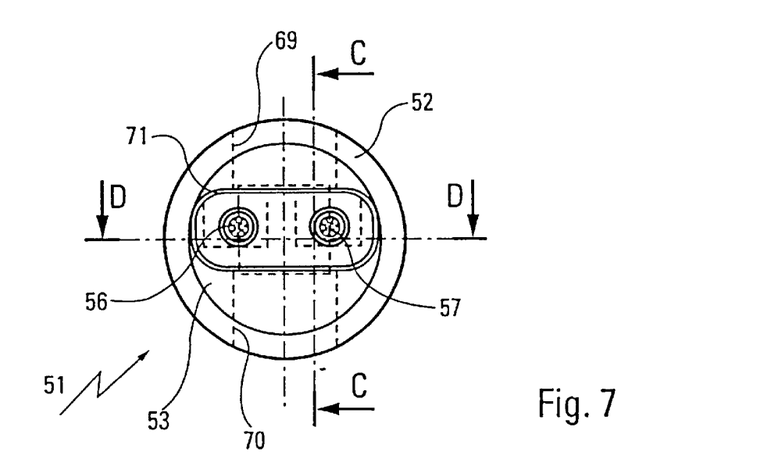
FIG. 7 is a view of the lower face of an initiator unit according to the invention, in which the conducting pincers and the electrodes form single pieces.
Figure 12:
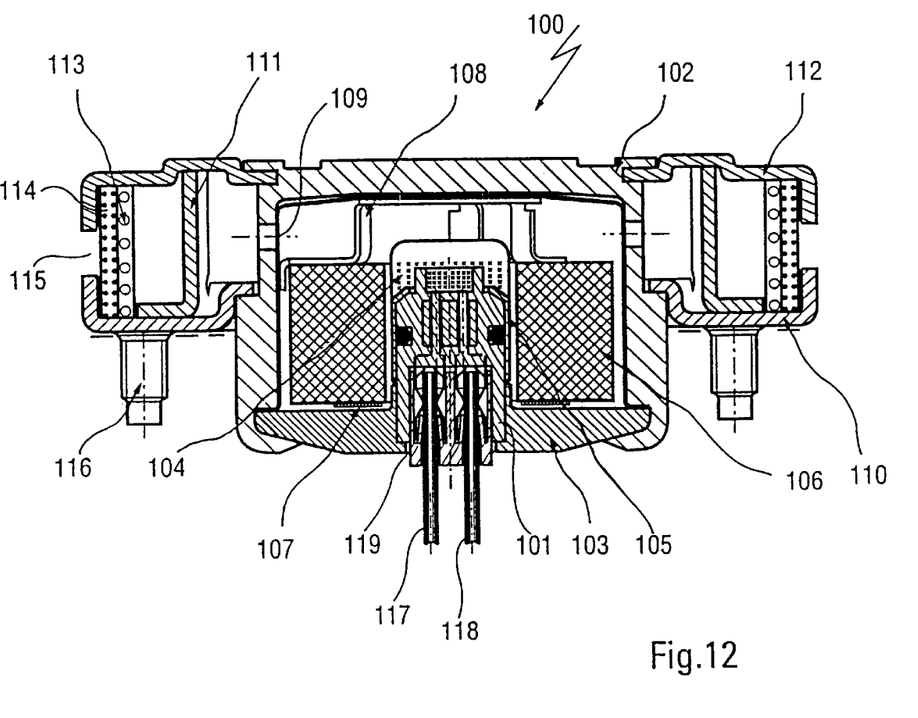
FIG. 12 shows, seen in section, a pyrotechnic gas generator for an inflatable cushion intended for the driver of a motor vehicle and equipped with an initiator unit as shown in FIGS. 7 to 9.

FIG. 12 shows an example of the use of an initiator unit such as the one described and illustrated in FIGS. 7 to 9 in a pyrotechnic gas generator 100 for an inflatable cushion.

The generator shown in this figure is described in detail in French Patent Application No. 2,730,965 and is more particularly intended to be housed in the steering wheel of a motor vehicle, in order to protect its driver.

The generator 100 comprises a cylindrical body 102 closed by a metal ring 103 crimped into the latter. The metal ring 103 comprises a central orifice in which the initiator unit 101 according to the invention is housed, this initiator unit being, in this example, reinforced by an active powder 104 contained in a shatterable metal shroud 105 placed around the initiator unit 101. The powder 104 is advantageously a powder based on boron and potassium nitrate.

A hollow cylindrical block 106 of a gas-generating pyrotechnic composition is placed around the ignition device thus formed. The gas-generating composition advantageously consists of a composite propellant having a silicone binder and the oxidizing charge of which is based on ammonium perchlorate and sodium nitrate. The block 106 is held in place by a spring 107 and by a metal clamping piece 108. Orifices 109 allow the combustion gases to leave the body 102 of the generator which carries an external annular ring 110 supporting a perforated deflector 111 as well as a diffuser 112. The gases leaving the body of the generator via the orifices 109 are distributed by the perforated deflector 111 onto condensation grilles 113 and 114 before leaving the generator via a peripheral circular opening 115 in order to inflate the protective cushion. Screws 116 carried by the external ring 110 allow the generator 100 to be fixed in the steering wheel.

The generator 100 may be easily assembled on a continuous assembly line using the initiator unit 101 without its lead wires 117 and 118 and its closure ring 119, these being fitted only at the end of the assembly line onto the completely assembled generator or even fitted only later onto the module incorporating this generator.

Figure 13:
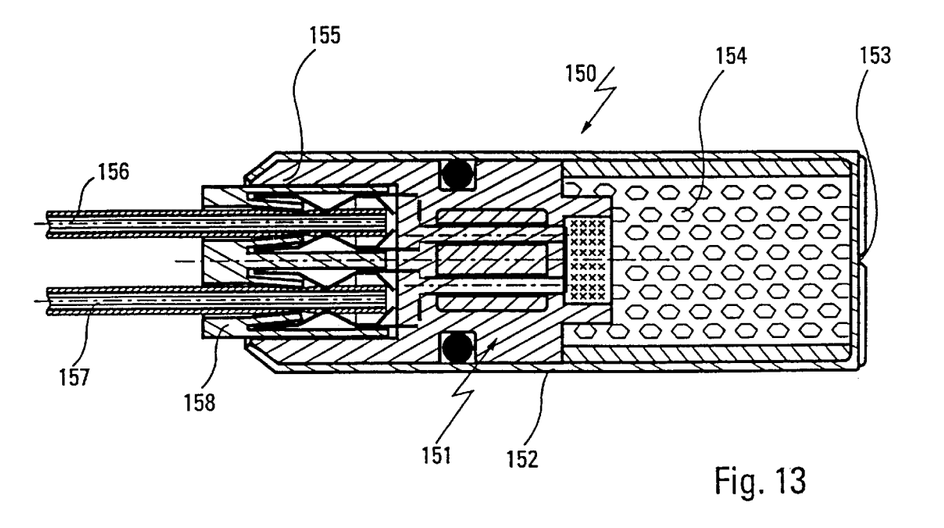
FIG. 13 shows, seen in section, a pyrotechnic gas generator for a seat-belt retractor equipped with an initiator unit as shown in FIGS. 7 and 9.

FIG. 13 shows an example of the use of an initiator unit 151, as described and illustrated by FIGS. 7 to 9, in a pyrotechnic gas generator 150 for retracting a seat belt.

The generator 150 is composed of a cylindrical metal body 152 having a cap 153 which can shatter under the effect of an increase in the pressure inside the generator.

The generator 150 contains an initiator unit 151 in accordance with the invention as well as a gas-generating powder 154. The body 152 of the generator is crimped onto the socket 155 of the initiator unit 151.

The generator 150 may also be easily assembled on a continuous assembly line using the initiator unit 151 without its lead wires 156 and 157 and its closure ring 158, which are fitted onto the completely assembled generator either at the end of the assembly line, or later, into the "seat-belt retractor" modules already assembled and incorporating the generator 150.

What is claimed is:

1. The two wire pyrotechnic initiator unit (1) consisting mainly of:
    i) a socket (2) whose ends consist of two plane faces (3,4,) the said socket being integrally formed with a first central bore and a second central bore, said first central bore (5), called "lower" bore, emerging on one of the said faces and into which two electrical lead wires (6,7) penetrate, each consisting of a conducting core (8) surrounded by an insulating sheath (9), and said second central bore (10), called the "upper" bore, which is separated from the first bore and which emerges on the other plane face (4) and which contains a pyrotechnic initiation device (11);
    ii) two electrodes (14, 15) fixed inside the said socket and the ends of which are located in each of the two bores (5,10), the lower ends of each electrode being connected to one of the said lead wires while the upper ends of the said electrodes are connected to the pyrotechnic initiation device (11);
    and characterized in that:
    iii) each of the said electrodes (14, 15) is terminated in its lower part by a conducting pincer (17,18) capable, under the stress of a thrust exerted in the extension of the said electrodes, of clamping one of the said lead wires (6,7), cutting its insulating sheath (9);
    iv) the lower part of the said first central bore (5) has at least one recess;
    v) the ends of the said lead wires (6,7) penetrating into the first central bore (5) of the socket (2) are supported by a closure ring (34) whose side wall has at least one external rib (35–36) allowing, by engagement in the said recess (32,33), the ring (34) to be irreversibly snap-fastened into the socket (2), the said ring moreover including elements for stressing the said conducting pincers (17, 18).

2. A pyrotechnic initiator unit according to claim 1, characterized in that the said first central bore (5) has two grooves (32, 33).

3. A pyrotechnic initiator unit according to claim 2, characterized in that the said socket (2) is an axisymmetric socket whose ends consist of two plane faces (3, 4) and in that said first bore (5) and said second bore (10) are axisymmetric bores.

4. A pyrotechnic initiator unit according to claim 3, characterized in that each conducting pincer (17) consists essentially of two plane metal tabs (25, 26) lying opposite each other, each tab including a deformable region (21, 22) consisting of two metal fastening elements (23, 24) in the form of circular sectors.

5. A pyrotechnic initiator unit according to claim 4, characterized in that two cylindrical bores (74, 75), into which each of the sheathed lead wires penetrate, pass through the said closure ring (71).

6. A pyrotechnic initiator unit according to claim 5, characterized in that the closure ring (71) comprises two cylindrical bores (74, 75) having a lower part whose diameter is substantially equal to the outside diameter of the sheathed lead wires and an upper part whose diameter allows insertion of one of the conducting pincers (67, 68); the closure ring thus having, in each of the bores (74, 75), a bottom (76, 77).

7. A pyrotechnic initiator unit according to claim 6, characterized in that the lower part of each bore is extended inside the ring (71) by a hollow cylindrical collar (78, 79) whose inside diameter is substantially equal to the outside diameter of the said sheathed wires, the bottoms (76, 77) and the said collars (78, 79) constituting the elements for stressing the said conducting pincers.

8. A pyrotechnic initiator unit according to claim 7, characterized in that the said socket (2) is moulded over the said electrodes (14, 15).

9. A two-wire pyrotechnic gas generator intended for motor-vehicle safety comprising a pyrotechnic gas generating composition which is fired by an initiator unit connected by lead wires to a collision detector, wherein said initiator unit is the two-wire pyrotechnic initiator unit according to any one of claims 1 to 8.

10. A two-wire pyrotechnic gas generator according to claim 9, in combination with a protective cushion, said cushion being configured for protecting an occupant of a motor vehicle.

11. A two-wire pyrotechnic gas generator according to claim 9, in combination with a seat-belt retractor, said seat belt retractor configured to protect an occupant of a motor vehicle.

12. A method of assembling on a continuous line a two-wire pyrotechnic gas generator using a pyrotechnic initiator unit according to claim 1, said method comprising:

providing an initiator unit, said initiator unit being without sheathed lead wires and without a closure ring;

incorporating said initiator into the pyrotechnic gas generator at the start of the assembly line; and subsequently incorporating said sheathed lead wires, said sheathed lead wires being supported by said closure ring, said lead wires being irreversibly incorporated into the initiator.

* * * * *